H. R. HUGHES.
ROLLER DRILL.
APPLICATION FILED MAR. 11, 1909.
1,010,143.
Patented Nov. 28, 1911.
3 SHEETS—SHEET 1.
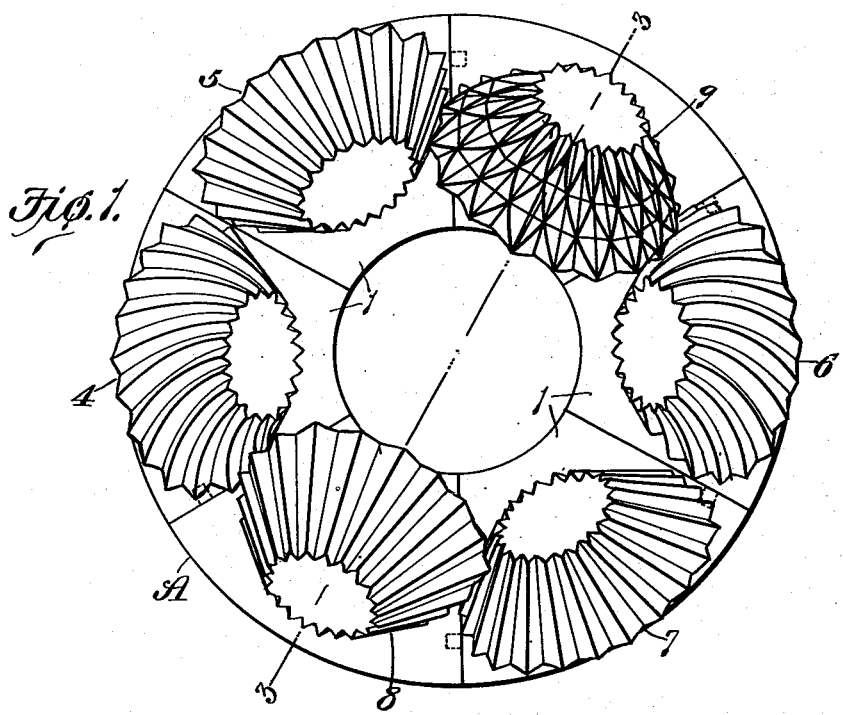
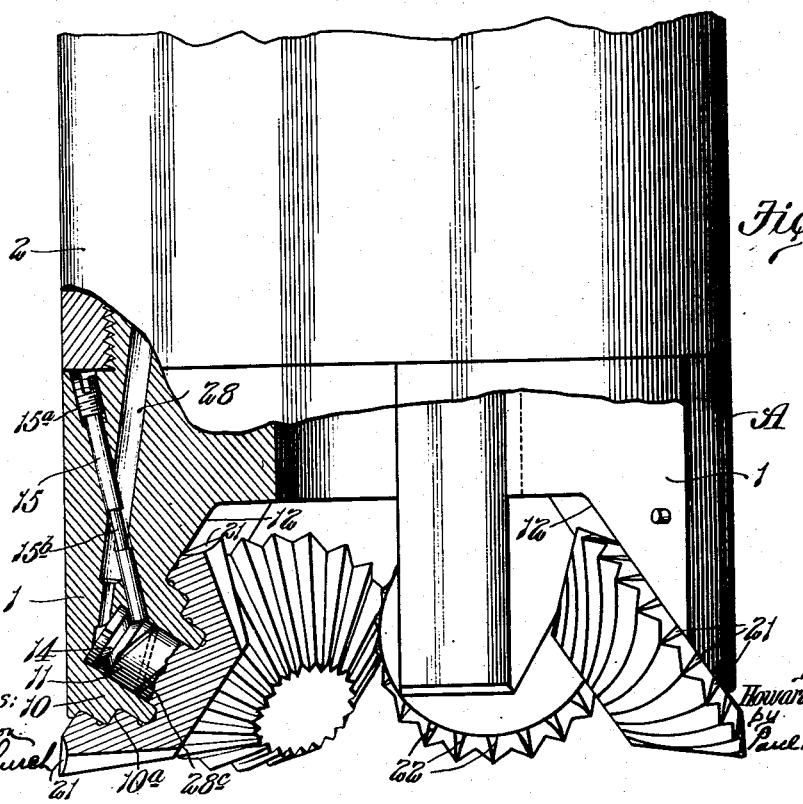
Inventor:
Howard R. Hughes.
by Paul Bakewell
Atty.

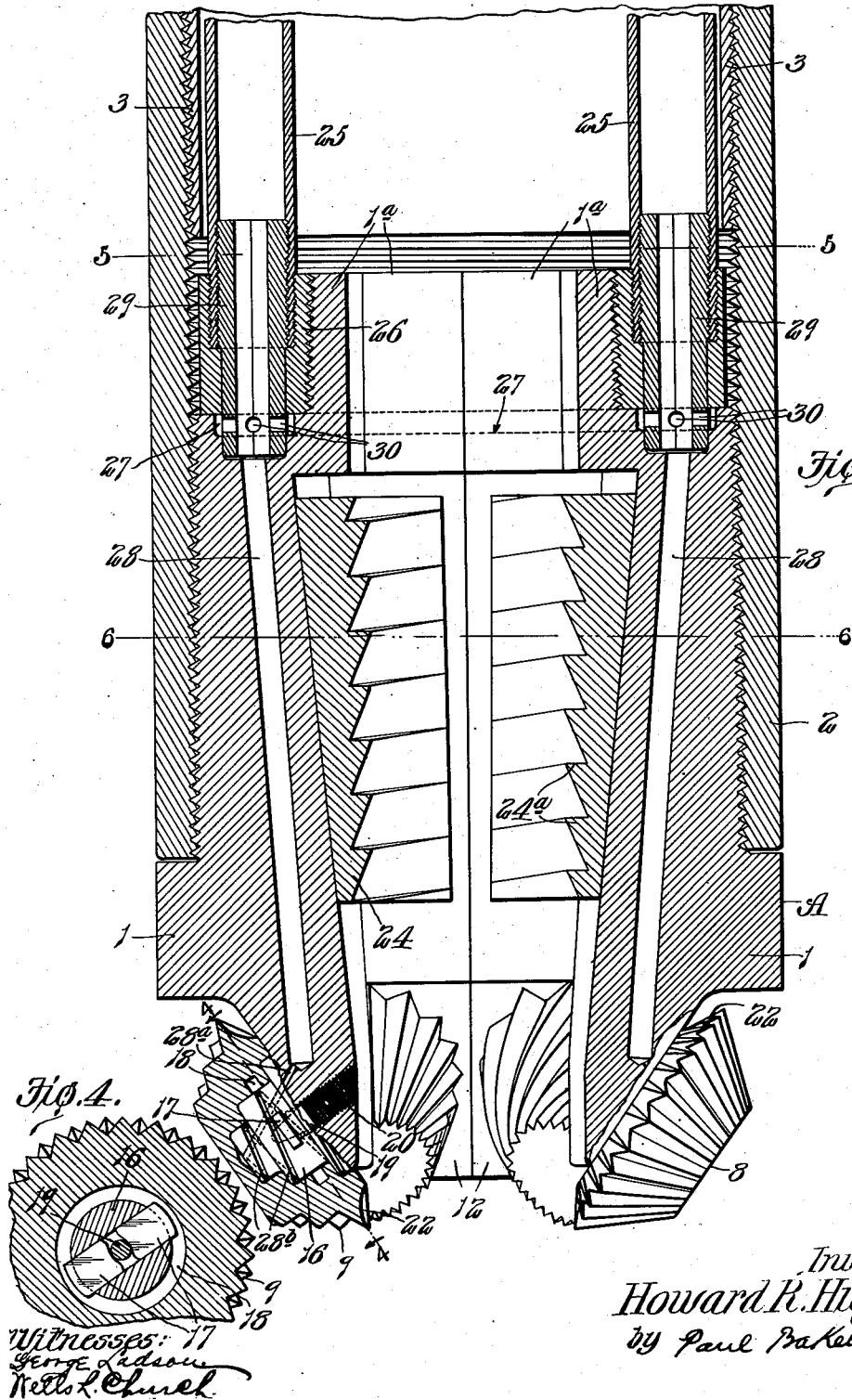

H. R. HUGHES.
ROLLER DRILL.
APPLICATION FILED MAR. 11, 1909.
1,010,143.
Patented Nov. 28, 1911.
3 SHEETS—SHEET 3.
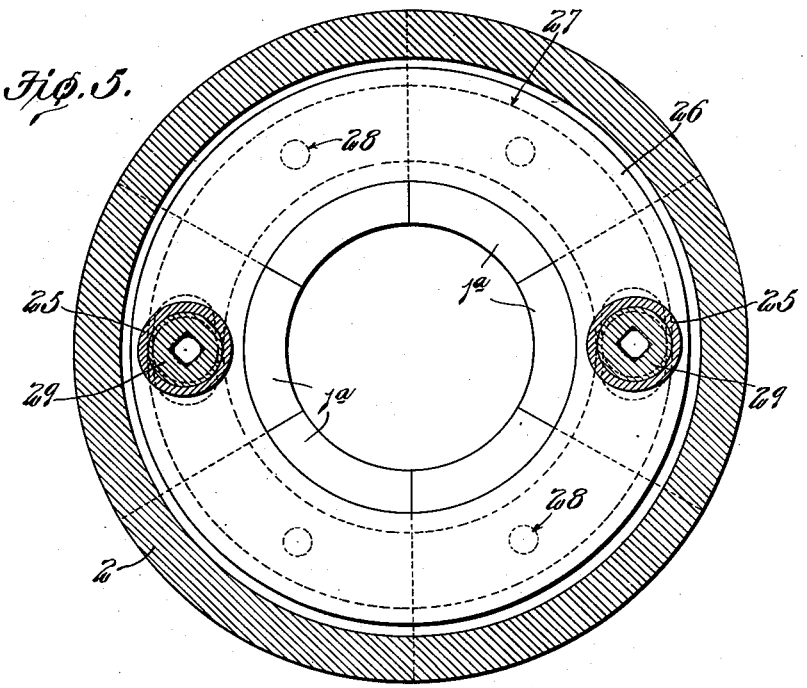
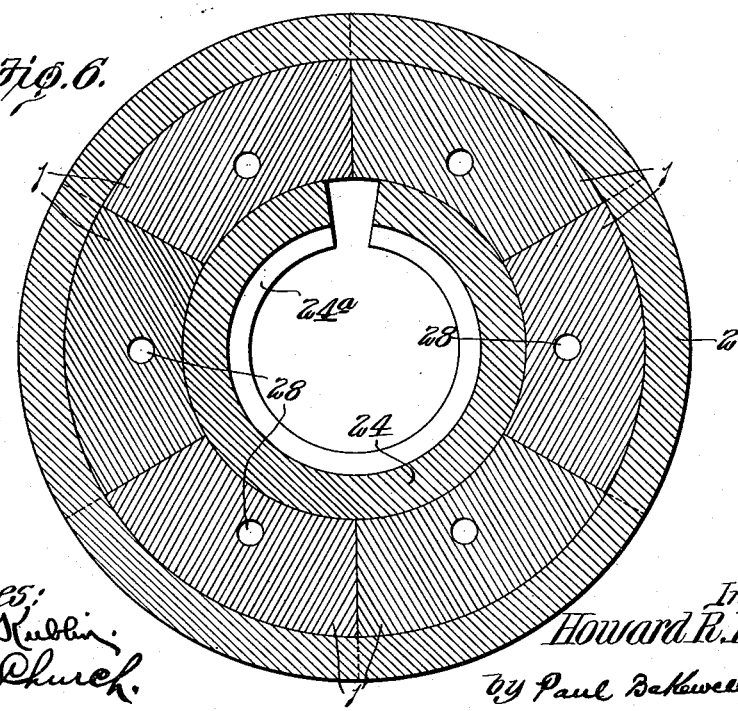

UNITED STATES PATENT OFFICE.

HOWARD R. HUGHES, OF HOUSTON, TEXAS.

ROLLER-DRILL.

1,010,143.  Specification of Letters Patent.  Patented Nov. 28, 1911.

Application filed March 11, 1909.  Serial No. 482,656.

*To all whom it may concern:*

Be it known that I, HOWARD R. HUGHES, a citizen of the United States, residing at Houston, Texas, have invented a certain new and useful Improvement in Roller-Drills, of which the following is a full, clear, and exact description, such as will enable others skilled in the art to which it appertains to make and use the same.

This invention relates to boring drills, and particularly to roller drills.

One object of my present invention is to provide a roller drill of novel construction that will leave a central core standing in the hole being formed.

Another object is to provide a drill of the type referred to in which the rollers are retained in their supporting spindles in a novel manner.

Another object is to provide a roller drill having means for breaking off the core that is left standing in the hole and carrying said core upwardly when the drill is withdrawn from the hole.

Another object is to provide a lubricated drill in which the ducts and grooves for distributing the lubricating medium are arranged in a novel manner.

Other objects and desirable features of my invention will be hereinafter pointed out.

Figure 1 of the drawings is a bottom plan view of a drill constructed in accordance with my invention; Fig. 2 is an elevational view of the drill head partly broken away to more clearly show the means for retaining some of the rollers on their supporting spindles; Fig. 3 is a vertical sectional view taken on approximately the line 3—3 of Fig. 1; Fig. 4 is a detail sectional view taken on the line 4—4 of Fig. 3; Fig. 5 is a horizontal sectional view taken on approximately the line 5—5 of Fig. 3; and Fig. 6 is a horizontal sectional view taken on approximately the line 6—6 of Fig. 3.

Referring to the drawings which illustrate the preferred form of my invention, A designates the head of the drill which consists of a plurality of parts or members 1 that are clamped together by an internally screw-threaded sleeve 2 which surrounds extensions on said members 1, as shown clearly in Fig. 3. In the construction herein shown, the head is composed of six members, each of which carries an approximately frusto-conical-shaped cutting roller but I wish it to be understood that it is immaterial, so far as my broad idea is concerned, whether said head is composed of six parts or a less number of parts. A long pipe 3 is screwed into the upper end of the sleeve 2 to form an operating member that imparts rotary movement to the head of the drill, said pipe also being utilized to introduce water down into the hole being formed so as to flush out the disintegrated material and also prevent the cutting rollers from becoming overheated.

As previously stated, the drill herein shown is provided with six frusto-conical-shaped cutting rollers, four of which are so arranged that they travel in a circular path adjacent the outer edge of the hole, and the other two being so arranged that they travel in a circular path inside of the path in which the four rollers travel. The rollers that travel in a path adjacent the outer edge of the hole are designated by the reference characters 4, 5, 6 and 7, the rollers 4 and 5 being arranged adjacent each other and diametrically opposite the rollers 6 and 7, as shown clearly in Fig. 1. The rollers that form the central core and travel in a path inside of that in which the rollers 4, 5, 6 and 7 travel, are designated by the reference characters 8 and 9, the roller 8 being arranged between the rollers 4 and 7 and diametrically opposite the roller 9 which is arranged between the rollers 5 and 6.

The members 1 of the head which carry the rollers 4, 5, 6 and 7 are provided with inclined spindles 10 that project inwardly toward the longitudinal center of the head, as shown in Fig. 2. The rollers that are mounted on said spindles 10 cover the ends of same, and each of said rollers is provided with an integral shank or auxiliary spindle 11 that projects into a bore in the spindle 10. The bases or inner end faces of the rollers 4, 5, 6 and 7 bear against inclined faces 12 on the members 1 which carry said spindles, thus producing a construction in which the rollers bear directly against the head which takes up the end thrusts to which the rollers are subjected. The spindles 10 are of comparatively great diameter at their bases or inner ends so that they will be strong and rigid, and said spindles are provided with one or more shoulders 10$^a$ that coöperate with shoulders on the internal bores of the rollers for taking up the end thrusts of the rollers. If desired, the internal bores of the rollers can be so formed that the rollers bear directly against the ends of the spindles 10. The auxiliary spindle or shank 11 on each of the rollers 4, 5, 6 and 7 is provided with a groove 14 into which a pin 15 on the head projects so as to retain the roller in position. The pin 15 passes freely through a bore in the head, and the upper end of the pin is provided with a screw-threaded head 15ª that coöperates with a screw-threaded portion of the bore through which the pin passes so as to retain the pin in position and also enable it to be withdrawn from engagement with the shank on the roller. After the pins 15 have been arranged in operative position it will be impossible for said pins to become displaced or drop out of the head, for the sleeve 2 that clamps the members 1 of the head together, extends over the upper ends of the pins 15, as shown in Fig. 2. The rollers 8 and 9 are mounted on inclined spindles 16 that project outwardly from the longitudinal center of the head, as shown in Fig. 3, said spindles being of similar construction to the spindles 10, previously described, so as to provide rigid supports for the rollers 8 and 9 that take up the end thrusts to which said rollers are subjected. The rollers 8 and 9 are not provided with shanks or auxiliary spindles like those on the rollers 4 to 7, but said rollers 8 and 9 are merely provided with internal bores that conform to the shape of the spindles 16.

The means herein shown for locking the rollers 8 and 9 on their spindles consists of a pair of keys 17 mounted in each of the spindles 16 and adapted to project laterally into a circular groove 18 on the internal bore of the roller, as shown clearly in Figs. 3 and 4, said keys being forced outwardly into said groove by means of a screw 19 having a tapered end that projects between the inner ends of the keys 17. After said screw 19 has been forced between the keys 17 so as to move said keys into engagement with the roller, a locking plug 20 is screwed into the socket in the head in which the screw 19 is mounted so as to prevent said screw from working loose.

The rollers 4, 5, 6 and 7 have cutting surfaces of any preferred design that disintegrate the material adjacent the outer edge of the hole, and each of said rollers is provided at its peripheral edge with cutting teeth 21 that shear off the material from the sides of the hole. The rollers 8 and 9 are provided with cutting surfaces of any preferred design for disintegrating the material at the bottom of the hole, and said rollers are provided on their peripheral edges with cutting teeth 22 that shear off the material from the exterior of the core that is left at the center of the hole, said core projecting upwardly through the head and into the long pipe or operating member 3 to which the head is connected. While I have herein stated that the rollers can be provided with any suitable kind of cutting surfaces I prefer to provide the rollers 5 and 7 with approximately straight chisel teeth and the rollers 4 and 6 with spiral chisel teeth, the teeth of the roller 6 being arranged oppositely to those of the roller 4. The roller 8 is provided with straight chisel teeth that extend in an opposite direction to the chisel teeth on the adjacent roller 7, and the roller 9 is provided with pyramidal-shaped projections. By providing the rollers with cutting surfaces of the character above described I obtain a drill that will disintegrate the material very finely for the teeth of the rollers form cross-cuts or grooves in the bottom of the hole.

The members 1, that constitute the head of the drill, are so shaped that a tapered opening will be formed in the center of the head so as to permit the core to project through said opening, and a core-engaging member 24 is arranged in this opening, as shown clearly in Fig. 3. This core-engaging member 24 consists of a split sleeve provided on its inner face with teeth 24ª that extend spirally around the core, thus forming practically a lefthanded screw-thread on the inner face of the member 24.

When it is desired to withdraw the drill from the hole, the head A is pulled upwardly, thus causing the side walls of the tapered opening in the center of the head to contract the core-engaging member 24 or force it into intimate engagement with the core that projects upwardly through same. The pressure which the member 24 exerts on the core is sufficient to break off the core, and as the teeth 24ª on said member bite into the core said core will be drawn out of the hole with the head of the drill. In case the member 24 fails to break off the core the head of the drill can be rotated and thus cause the screw teeth of the member 24 to travel upwardly on the core.

In my prior U. S. Letters Patent No. 930,759, dated August 10, 1909, I have shown and described a roller drill in which the pressure of the water that is forced through the long tubular-shaped operating member causes a lubricating medium to be supplied to the bearings of the rollers. The drill herein shown is also provided with a lubricating means but said means is of slightly different construction from that shown in my application above referred to. In the drill herein shown a pair of tubular-shaped lubricant-holders 25 are arranged inside of the pipe 3 which carries the head of the drill, the lower ends of said tubes 25 being screwed into a ring 26 that surrounds externally screw-threaded extensions 1ª on the upper ends of the members 1 that constitute the head of the drill. A channel 27 is formed in the drill head members 1 underneath the ring 26, and each member 1 of the head is provided with a duct 28 that leads from said channel so as to distribute the lubricating medium to the rollers. I prefer to provide each of the lubricant-holders 25 with a nipple 29 that projects into a recess in one of the drill head members 1 so as to overcome any tendency of the ring 26 to turn or work loose, each of said nipples being provided with a non-circular bore, as shown in Fig. 3, so that a socket wrench can be inserted into same to screw the nipple into the lower end of the tube 25 which carries it. A lubricating medium, which is preferably in a compressed state, is placed in the tubes 25, and the water that is forced down through the long pipe 3 to flush out the hole, exerts sufficient pressure on said lubricant to force it through holes 30 in the lower end of the nipples 29 into the channel 27 with which the ducts 28 communicate, the lubricant flowing down through said ducts to distributing grooves on the internal bores of the rollers and the spindles on which said rollers are mounted.

Each of the spindles 16 for the rollers 8 and 9 is provided with an internal duct 28$^a$ that extends from one of the ducts 28 to the outer end of the spindle, and spiral grooves 28$^b$ are formed either on the exterior of the spindle or on the internal bore of the roller for distributing the lubricating medium over the surfaces on which the roller bears, the lubricating medium finally escaping through ducts or grooves formed in the surface of the head against which the bases or inner ends of the rollers bear. The auxiliary spindles or shanks of the rollers 4, 5, 6 and 7 are provided on their exterior with spirally arranged grooves 28$^c$ that permit the lubricating medium to work over said auxiliary spindles to the ends of the spindles 10 and thence through grooves on the internal bores of the rollers to the surfaces of the head against which the bases of the rollers bear. In view of the fact that the pins 15 that retain the rollers 4, 5, 6 and 7 in operative position, intersect the ducts 28 that supply the lubricating medium to said rollers, I prefer to reduce said pins slightly at 15$^b$ where they intersect said ducts, as shown in Fig. 2, so as not to obstruct the passage of the lubricant through said ducts.

Having thus described my invention, what I claim as new and desire to secure by Letters Patent is:

1. In a boring drill, the combination of a head, a plurality of spindles on said head that project downwardly and outwardly from the longitudinal center of the head, independent spindles arranged between those first referred to and projecting downwardly and inwardly toward the longitudinal center of the head, and approximately frusto-conical-shaped cutting rollers mounted on said spindles.

2. In a boring drill, the combination of a head, a plurality of spindles on said head that project downwardly and outwardly from the longitudinal center of the head, independent spindles arranged between those first referred to and projecting downwardly and inwardly toward the longitudinal center of the head, and approximately frusto-conical-shaped cutting rollers mounted on said spindles, the spindles which project outwardly from the head being so disposed that the rollers thereon will leave a core standing in the center of the hole which the drill forms.

3. In a boring drill, the combination of a head, a plurality of spindles on said head that project downwardly and outwardly from the longitudinal center of the head, independent spindles arranged between those first referred to and projecting downwardly and inwardly toward the longitudinal center of the head, approximately frusto-conical-shaped cutting rollers mounted on said spindles, said rollers being so formed that they cover the ends of said spindles, and means for retaining the rollers in operative position on the spindles.

4. In a boring drill, the combination of a head, a plurality of spindles on said head that project downwardly and outwardly from the longitudinal center of the head, independent spindles arranged between those first referred to and projecting downwardly and inwardly toward the longitudinal center of the head, approximately frusto-conical-shaped cutting rollers mounted on said spindles, said rollers being so formed that they cover the ends of said spindles, means for retaining the rollers in operative position on the spindles, and inclined faces on said head against which the base ends of said rollers bear.

5. In a drill, a head, a set of angularly disposed conical-shaped cutting rollers arranged on said head and provided adjacent their base ends with teeth that operate upon the material at the side and a portion of the bottom of the hole being formed, and an independent set of approximately conical-shaped cutting rollers arranged between the rollers first referred to and at an opposite angle to said rollers so that a core is left standing in the hole which the drill forms.

6. A drill comprising a head provided with a plurality of cutting rollers, a lubricant-holder carried by said head, an annular groove or channel in said head arranged above the rollers for receiving the lubricating medium in said holder, and a plurality of ducts leading from said groove for supplying the lubricant to the bearings of said rollers.

7. A drill comprising a head provided with cutting rollers, a plurality of lubricant-holders carried by said head, an annular channel or groove formed in the head above said roller for receiving the lubricant from said holders, and a plurality of distributing ducts communicating with said groove for distributing the lubricant to the bearings of the rollers.

8. A drill comprising a head which consists of a plurality of members, a long pipe or operating member to which said head is connected, cutting rollers, mounted on said head, a ring surrounding extensions on the upper ends of the members that form the head, and lubricant-holders carried by said ring and provided with extensions that project into sockets in some of the drill head members to prevent the ring from moving relatively thereto.

9. A drill comprising a head which consists of a plurality of members, a sleeve surrounding said members for clamping them together, a ring arranged inside of said sleeve and surrounding extensions on the upper ends of the drill head members, lubricant-holders carried by said ring and provided with extensions that fit in sockets in some of the drill head members to prevent the ring from rotating, a channel or groove in said head for receiving the lubricating medium from said holders, rollers carried by said head, and ducts communicating with said channel for conveying the lubricating medium to the bearings of the rollers.

10. A drill comprising a head which consists of a plurality of members that are provided with a tapered socket, a device that surrounds said members for holding them together, approximately frusto-conical-shaped cutting rollers mounted on said members and arranged outside of said socket so that a central core of material will be left standing at the bottom of the hole which the drill forms, and a core-engaging device arranged in the tapered socket in the members that constitute the head of the drill.

11. In a drill of the character described, a head that consists of a plurality of members, some of which are provided at their lower ends with faces that incline downwardly and inwardly toward the longitudinal center of the head, means for clamping said members together, spindles projecting outwardly and downwardly from the inclined faces at the lower ends of said members, approximately conical-shaped cutting rollers mounted on said spindles and arranged with their base ends bearing against the inclined faces of said members, and a second set of approximately conical-shaped cutting rollers on said head arranged oppositely to the rollers first referred to.

12. A drill comprising a head, a set of approximately frusto-conical-shaped rollers mounted on said head and arranged with their axes inclined downwardly and inwardly toward the longitudinal center of the head, and an independent set of approximately frusto-conical-shaped rollers mounted on said head and arranged between the rollers first referred to with their axes inclined downwardly and outwardly from the longitudinal center of the head, some of said rollers being provided with straight chisel teeth and others being provided with spirally-arranged chisel teeth.

13. A drill comprising a head, a plurality of approximately frusto-conical-shaped rollers mounted on said head and arranged with their axes inclined downwardly and inwardly toward the longitudinal center of the head, and a plurality of approximately frusto-conical-shaped rollers mounted on said head and arranged between the rollers first referred to with their axes inclined downwardly and outwardly from the longitudinal center of the head, said rollers being provided with cutting surfaces which form cross-cuts or intersecting grooves on the bottom of the hole.

In testimony whereof I hereunto affix my signature in the presence of two witnesses, this 10th day of March 1909.

HOWARD R. HUGHES.

Witnesses:
WELLS L. CHURCH,
E. C. OWEN.